United States Patent [19]

Muszynski

[11] 4,371,639
[45] Feb. 1, 1983

[54] POLYESTER POLYMER CONCRETE COMPOSITIONS

[75] Inventor: Larry C. Muszynski, Houston, Tex.

[73] Assignee: Shell Oil Company, Houston, Tex.

[21] Appl. No.: 250,990

[22] Filed: Apr. 3, 1981

[51] Int. Cl.³ .................... C08K 3/34; C08L 67/06
[52] U.S. Cl. .................... 523/512; 524/604; 524/65
[58] Field of Search .............. 260/40 R, DIG. 40; 523/512, 518, 521; 524/59, 65, 601, 605

[56] References Cited

U.S. PATENT DOCUMENTS 4,147,687  4/1979  O'Donnell ............... 260/40 R
4,210,457  7/1980  Dodson et al. ............ 106/97
4,212,790  7/1980  Ibata et al. .............. 260/40 R

FOREIGN PATENT DOCUMENTS 48-03533  1/1973  Japan .................. 260/40 R

Primary Examiner—Theodore Morris
Assistant Examiner—Robert E. L. Sellers
Attorney, Agent, or Firm—Norris E. Faringer

[57] ABSTRACT

Curable polymer concrete compositions suitable for articles of construction comprise (1) a minor amount of a polyester resin composition, (2) a major amount of an aggregate blend comprising (a) sand and (b) fly ash and (3) a free-radical curing agent.

13 Claims, No Drawings

POLYESTER POLYMER CONCRETE COMPOSITIONS

BACKGROUND OF THE INVENTION

The use of polymeric materials in concrete formulations is well known. One common composite material is called polymer-impregnated concrete (PIC) wherein hardened portland cement concrete is impregnated with a liquid monomeric material which is subsequently polymerized in situ. These materials have remarkable durability and resistance against salts and the like which make their use especially attractive for concrete pipe, desalting plants, tunnel support linings and bridge decks. Another system is a polymer-portland cement concrete (PPCC) which is produced by adding a monomeric or polymeric material to a fresh portland cement concrete mixture which is subsequently cured and polymerized after placement. It will be appreciated that both the PIC and PPCC systems are hydraulic systems, i.e., they require the use of water to cure the portland cement. Accordingly, another system has more recently been discovered which is called polymer concrete (PC) which contains little or no cement and no water. The PC is a composite formed by polymerizing a monomeric material with aggregate (gravel, sand, etc.).

The resin most often employed in present PC Compositions are the so-called acrylate resins, especially, methyl methacrylate. These acrylate resins are relatively inexpensive; however, they suffer a multitude of serious shortcomings. For example, they exhibit high volatility, high toxicity, high flammability, and are explosive. More importantly, they exhibit high shrinkage which severely limits their useful life in some applications.

It has now been found that a number of these serious environmental shortcomings (toxicity, volatility, etc.) can be eliminated by the replacement of the methacrylate resins with polyester resins in combination with an aggregate composition containing fly ash.

A novel composition has now been discovered which exhibits increased and improved physical and chemical properties, especially reduced shrinkage after cure.

It has further been discovered that when the polyester is a special vinyl ester derived from epoxy compounds, the resulting cured composition exhibits unexpectedly reduced shrinkage not heretofore exhibited or found in polymers concrete compositions. This improvement is disclosed and claimed in copending patent application Ser. No. 250,979, filed Apr. 3, 1981.

SUMMARY OF THE INVENTION

The present invention is directed to curable polymer concrete compositions, particularly suitable for articles of construction, comprising (1) a polyester composition, (2) an aggregate blend comprising (a) sand and (b) fly ash, and (3) a free-radial curing agent (initiator).

These compositions are especially suitable for use in making pipe, bridge decks, dam spillways, building panels, tank linings and the like. Articles of construction prepared from these novel compositions exhibit lower cost, excellent chemical resistance and physical properties, such as high strength and relatively low shrinkage.

DESCRIPTION OF THE PREFERRED EMBODIMENTS

The present invention is directed to curable compositions, particularly suitable for articles of construction, comprising:

(1) from about 3% to about 15% by weight of a polyester composition,
(2) from about 85% to about 97% by weight of an aggregate composition comprising:
  (a) from about 50% to about 95% by weight of sand,
  (b) from about 5% to about 50% by weight of fly ash, and
(3) a free-radical curing agent, preferably an organic peroxide.

It will be appreciated that a portion of either the sand or the fly ash may be replaced with other materials, especially reinforcing materials, such as glass fibers or mats; metallic staples; fibers, or mats; polymeric materials such as rubber, plastics, etc; expanded mica (Vermiculite) and Pearlite, etc.; and coarse gravel (e.g., >20 mesh to 1¼"); and the like.

POLYESTERS

Any conventional polyester is adaptable for use in the present compositions. The basic technology for the manufacture of unsaturated polyesters is well established. Simply, such polyesters are prepared by either the fusion or solvent process wherein saturated and/or unsaturated polycarboxylic acids and/or anhydrides are polyesterified with polyhydric alcohols (glycols), alkalene oxides and the like.

Suitable carboxyl-containing compounds include the saturated and unsaturated aliphatic, aromatic and cycloaliphatic polycarboxylic acids and polycarboxylic acid anhydrides, which compounds may be substituted with halogen atoms and the like.

Typical such carboxyl-containing compounds are maleic acid, maleic anhydride, crotonic acid, itaconicanhydride, tetrahydrophthalic acid, fumaric acid, phthalic anhydride isophthalic anhydride, terephthalic anhydride, hexahydrophthalic anhydride, pyromellitic anhydride, methylated maleic adducts of phthalic anhydride, dodecenyl succinic anhydride, dichloromaleic anhydride, tetrachlorophthalic anhydride, chlorendic anhydride, pyromellitic dianhydride, diamethylmaleic anhydride, n-butylmaleic anhydride, phenylmaleic anhydride, bromophenylmaleic anhydride, and the like.

Suitable polyhydric compounds include the alcohols, phenols, glycols, alkylene oxides, as well as mixtures and adducts thereof.

Typical polyhydric compounds, among many others are glycerol, Bisphenol A, pentaerythritol, ethylene glycol, propylene glycol, neopentyl glycol, and the like.

The polyesters may be further modified as is customary by reaction with or addition of other monomers and the like.

The preparation of such polyesters form no part of the instant invention, and suitable polyesters can be made by any known technique wherein polyesterification of polycarboxylic compounds with polyhydric compounds is achieved, with or without, azeotropic distillation, using either the batch-fusion, batch-solvent or continuous process.

It has been found, however, that polyesters having a phenolic component, i.e., a bisphenol as a reactant, are preferred because of the improvement in heat deflection temperatures.

The polyesters may be mixed with one or more compatible unsaturated monomers. Examples of such monomers include, among others, aromatic compounds such as styrene, alpha-methylstyrene, dichlorostyrene, vinyl naphthalene, vinyl phenol and the like, unsaturated esters, such as acrylic and methacrylic esters, vinyl acetate, vinyl benzoate, vinyl chloroacetate, vinyl laurate, and the like, unsaturated acids, such as acrylic and alpha-alkylacrylic acids, butenoic acid, allylbenzoic acid, vinylbenzoic acid, and the like, halides, such as vinyl chloride, vinylidene chloride, nitriles, such as acrylonitrile, methacrylonitrile, diolefins, such as butadiene, isoprene, methylpentadiene, esters of polycarboxylic acids, such as diallyl phthalate, divinyl succinate, diallyl maleate, divinyl adipate, dichlorallyl tetrahydrophthalate, and the like, and mixtures thereof.

The amount of unsaturated monomer will vary widely; however, the weight ratio of polyester to unsaturated monomer will generally vary from about 100.0:0.0 to about 20.0 to 80.0, with from about 95.0:5.0 to about 35.0:65.0 being preferred, and from about 60.0:40.0 to 40.0:60.0 being especially preferred.

Especially preferred unsaturated comonomers are the aromatic unsaturated compounds such as styrene, vinyl toluene and divinyl benzene, etc.

POLYESTER CURING AGENTS

Examples of suitable polyester curing agents (catalysts) are the free-radical yielding compounds and suitable radiation. Examples of such catalysts includes the peroxides, such as benzoyl peroxide, tertiary butyl hydroperoxide, ditertiary butyl peroxide, hydrogen peroxide, potassium persulfate, methyl cyclohexyl peroxide, cumene hydroperoxide, acetyl benzoyl peroxide, Tetralin hydroperoxide, phenylcyclohexane hydroperoxide, tertiary butylisopropylbenzene hydroperoxide, tertiary butylperacetate, tertiary butylacetate, tertiary butyl perbenzoate, ditertiary amyl perphthalate, ditertiary butyl peradipate, tertiary amyl percarbonate, and the like, and mixtures thereof; azo compounds such as 2,2'-azobisisobutyronitrile, dimethyl 2,2'-azobisisobutyrate, 2,2'-azobis(2,4-dimethylvaleronitrile), 2,2'-azobisisotuylamide, and the like. Particularly preferred catalysts include the diaroyl peroxide, tertiary alkyl hydroperoxides, alkyl peresters of percarboxylic acids and particularly those of the above-noted groups which contain no more than 18 carbon atoms per molecule and have a decomposition temperature below 125° C.

The amount of free-radical initiator will be a curing amount and will generally vary from about 1% to about 15% by weight based on the polyester, or polyester blend thereof.

AGGREGATE

As noted hereinbefore, an essential component in the present composition is a blend of at least sand and fly ash.

In general, the sand which is preferred in the present composition is the sand derived from the crushing of rock and the like. In other words, the sand has been obtained as a fractured product and exhibits an irregular and somewhat sharp feel. This sand is required in conventional hydraulic concretes and mortars to impart the necessary structural strength. The so-called "beach" sand which has been uniformly rounded by the wind and/or water action, in general, produces poor physical properties in hydraulic concretes and conventional PC compositions; however, such sands, while not as good as fractured sand, can be used in the present compositions to give good physical properties not exhibited by conventional PC compositions.

In general, the sand which is suitable in the present compositions is a relatively dense silica material having a particle size from about 5 mesh to about 100 mesh, with from about 20 to about 40 mesh being preferred.

The preferred sand is a crushed or fractured sand rather than the so-called beach or river bank sand which has been rounded by the action of wind and water. It will be appreciated, however, that for some applications where the ultimate properties of the cured PC composition are not a premium consideration, these sands or blends with fractured sands may be employed.

Fly ash is derived as a by product of the firing of coal. It will be appreciated that because of the differences in coal sources, coal compositions, as well as coal-firing equipment and techniques and firing practices in the industry, the physical properties, chemical compositions and pozzolanic activity of the fly ashes will vary markedly. The extent and rate of pozzolanic reaction involving fly ashes is apparently a function of several factors, including the quantity of lime, cement, total silica and/or alumina in the fly ash. For example, DOT report No. FHWA-IP-76-16, states that fly ashes having large amounts of free lime as indicated by CaO content tend to be very reactive and probably exhibit some degree of self-hardening. The following Table I (taken from U.S. Pat. No. 4,210,457) details the typical chemical analysis of fly ashes from sources A through K (source not identified). Table I gives the approximate percent by weight of $SiO_2$; $Al_2O_3$; and $Fe_2O_3$; combined $SiO_2$, $Al_2O_3$ and $Fe_2O_3$; CaO; MgO; and $SO_3$ found as well as the loss on ignition (LOI) for each of the fly ash samples A through K, as calculated according to ASTM C114-77. Also shown in Table I is the percentage of "free lime" as calculated according to ASTM C-25, Section 28.3 (1972).

TABLE I

| SOURCE | A | B | C | D | E | F | G | H | I | J | K |
|---|---|---|---|---|---|---|---|---|---|---|---|
| Chemical Components | | | | | | | | | | | |
| % $SiO_2$ | 31.4 | 43.1 | 37.6 | 24.1 | 39.8 | 48.9 | 52.2 | 47.1 | 43.3 | 47.6 | 56.5 |
| $Al_2O_3$ | 19.7 | 21.8 | 27.5 | 14.3 | 16.8 | 29.6 | 31.0 | 20.8 | 18.5 | 23.3 | 24.7 |
| $Fe_2O_3$ | 6.6 | 4.2 | 7.3 | 9.5 | 6.8 | 9.3 | 8.3 | 16.0 | 29.9 | 16.0 | 5.6 |
| CaO | 20.2 | 23.5 | 17.9 | 29.6 | 16.8 | 6.2 | 4.9 | 5.0 | 4.3 | 7.6 | 7.7 |
| MgO | 3.9 | 3.8 | 3.7 | 8.5 | 5.3 | 0.7 | 0.7 | 1.8 | 0.9 | 1.4 | 2.0 |
| $SO_3$ | 6.4 | 1.6 | 5.7 | 5.9 | 2.8 | 0.6 | 0.3 | 0.6 | 1.2 | 0.7 | 0.5 |
| Loss on Ignition | 1.4 | 0.5 | 0.5 | 0.6 | 0.3 | 2.3 | 4.2 | 2.8 | 1.2 | 0.6 | 1.2 |
| $SiO_2 + Al_2O_3 + Fe_2O_3$ | 57.7 | 69.1 | 72.4 | 47.9 | 63.4 | 87.8 | 91.5 | 83.9 | 91.7 | 86.9 | 1.8 |
| Free Lime | 1.35 | 1.91 | 0.93 | 3.63 | 0.83 | 0.44 | 0.0 | 0.63 | 0.54 | 0.13 | 1.45 |

Table I is presented herein for illustration of typical properties only. The fly ashes employed in the present compositions were not analyzed for chemical content. While the activity of the several fly ashes varied somewhat, no fly ash was found that was inoperable in the present compositions. Accordingly, one skilled in the art would be advised to vary the amount and source of the fly ash to optimize the properties of the instant compositions commensurate with his end use objectives.

As noted hereinbefore, both the sand and fly ash may be replaced in part with gravel, crushed stone, expanded mica and other silica and inorganic materials; expanded polymers; metal fibers, staples, bars and/or mesh; glass fibers or mats; etc.

For some structural applications, gravel (pea to egg size) may be incorporated into the composition. In general, up to about 50% and preferably up to about 25% of the sand/fly ash blend may be replaced with gravel.

Also, for producing lightweight and insulating materials, a portion, of say up to about 25% of the sand/fly ash blend may be replaced with an insulating material such as expanded mica and the like.

Of course, other materials may be mixed or added, including, plasticizers, stabilizers, extenders, oils, resins, tars, asphalts, pigments, reinforcing agents, thioxotropic agents, and the like.

The compositions of the present invention are simply made by mixing the components together, placing the blend into a suitable mold or form and allowed to cure or harden. In general, the polymerization temperature will vary from about 0° C. to about 200° C. and more preferably from about 20° C. to about 100° C.

The instant compositions may be utilized in the preparation of a wide variety of articles, especially articles of construction such as pipes, pipe linings, building panels, armor plating, dam and spillway overlays, etc.

The following examples are given to illustrate the instant compositions. It should be understood that the examples are given for the purpose of illustration only and the invention is not to be regarded as limited to and specific component or specific conditions recited therein. Unless otherwise indicated parts and percentages are by weight.

Polyester A is an isophthalic/glycol polyester (Reichold, Polylite 31-439).

Vinyl Ester Resin A is a vinyl ester resin-styrene blend containing 62.5 parts by weight of a vinyl ester prepared by reacting one mole of a glycidyl polyether of 2,2-bis(4-hydroxyphenyl)propane having an epoxy equivalent weight of about 375 and an average molecular weight of about 920 with two moles of methacrylic acid in the presence of an esterification catalyst, and 37.5 parts by weight of styrene.

EXAMPLE I

This example illustrates the preparation of the instant compositions with both non-fractured sand and fractured sand as well as compositions containing no fly ash.

The following compositions were prepared by mixing the various components together and test specimens prepared by curing at room temperature for 1 hour and post-curing at 95° C. for 30 minutes [all compositions contained 2% by weight of methyl ethyl ketone peroxide (MEKP) and 0.4% by weight of cobalt naphthenate, based on the weight of Polyester A].

| Composition | Parts by Weight |
|---|---|
| Composition A | |
| Polyester A | 17 |
| Aggregate | 83 |
| (a) Saudi Dune Sand 50% | |
| 71% <100 mesh | |
| 22% #50 mesh | |
| 7% #30 mesh | |
| (b) Saudi Coarse River Gravel 50% | |
| 42% #12 mesh | |
| 43% #30 mesh | |
| 15% #50 mesh | |
| Composition B | |
| Polyester A | 17 |
| Aggregate (Sand #17) | 83 |
| 9% 40 mesh | |
| 41% 50 mesh | |
| 31% 70 mesh | |
| 14% 100 mesh | |
| 5% passing 100 mesh | |
| Composition C | |
| Polyester A | 14 |
| Aggregate | 86 |
| (a) 50/50 Saudi Blend of Composition A 80% | |
| (b) Fly ash 20% | |
| Composition D | |
| Polyester A | 14 |
| Aggregate | 86 |
| (a) Sand #17 80% | |
| (b) Fly ash 20% | |

The above compositions were cured at room temperature for 1 hour and then post cured at 95° C. for 30 minutes. The flexural and compressive strength of the cured compositions were then determined and the data is presented in Table II.

TABLE II

| COMPOSITION | COMPRESSIVE STRENGTH, PSI | FLEXURAL STRENGTH, PSI |
|---|---|---|
| A | 9,300 | 2,610 |
| B | 9,860 | 2,720 |
| C | 11,390 | 3,050 |
| D | 12,840 | 3,800 |

The data clearly indicates that fly ash increased the compressive and flexural strengths of the polyester-based polymer concrete both when "contaminated rounded" sand was employed and when a good fractured sand was employed.

EXAMPLE II

When Composition D is applied as a pipe lining via centrifugal casting methods and cure, the resulting lining exhibits chemical resistance.

EXAMPLE III

The procedures of Example I were essentially repeated wherein Polyester A is replaced with an equivalent amount of the following polyesters:

(1) BPA-based polyester containing 50% by weight of styrene (Diamond Shamrock, DION 6694NP);

(2) DION 6315 (Diamond Shamrock);

(3) DION 6308 (Diamond Shamrock);

(4) Orthophthalic/glycol polyester (Reichlod, Polylite 31-006).

Related results are obtained in each instance.

EXAMPLE IV

The impact resistance is improved by the addition of metallic reinforcement such as metal staples to the composition of Example I. Likewise, the replacement of about 20% of the sand with fractured gravel improved the impact resistance.

What is claimed is:

1. A curable polymer concrete composition, suitable for articles of construction, comprising:
   (1) from about 3% to about 15% by weight of a polyester composition,
   (2) from about 85% to about 97% by weight of an aggregate composition comprising
      (a) from about 50% to about 95% by weight of sand, and
      (b) from about 5% to about 50% by weight of fly ash, and
   (3) a free-radical initiator.

2. The composition of claim 1 wherein the polyester is prepared by esterifying a glycol with a polycarboxylic acid or acid anhydride.

3. The composition of claim 2 wherein the polycarboxylic acid is orthophthalic or isophthalic acid.

4. The composition of claim 1 wherein the polyester composition comprises from about 50% to about 80% polyester and from about 20% to about 50% by weight of styrene.

5. The composition of claim 1 wherein a metallic reinforcing material is additionally incorporated in the composition.

6. The composition of claim 1 wherein the aggregate composition additionally contains up to about 25% by weight of gravel.

7. The composition of claim 1 wherein the free-radical initiator is a peroxide.

8. The composition of claim 7 wherein the peroxide is methyl ethyl ketone peroxide.

9. An article comprising at least one substrate layer and at least one layer prepared by curing a composition comprising:
   (1) from about 3% to about 15% by weight of a polyester composition,
   (2) from about 85% to about 97% by weight of an aggregate composition comprising:
      (a) from about 50% to about 95% by weight of sand, and
      (b) from about 5% to about 50% by weight of fly ash, and
   (3) a free-radical initiator.

10. The article of claim 9 wherein the polyester composition comprises from about 50% to about 80% polyester and from about 20% to about 50% by weight of styrene.

11. The article of claim 9 wherein the polyester is prepared by esterifying a glycol with a polycarboxylic acid.

12. The article of claim 11 wherein the polycarboxylic acid is isophthalic or orthophthalic acid.

13. The article of claim 9 wherein the substrate is metallic.

* * * * *